(12) United States Patent
Jahan (10) Patent No.: US 12,047,221 B2
(45) Date of Patent: Jul. 23, 2024

(54) TELECOMMUNICATION METHOD WITH POLAR CONSTELLATIONS AND CORRESPONDING DEVICES

(71) Applicant: Orange, Issy-les-Moulineaux (FR)

(72) Inventor: Bruno Jahan, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/917,388

(22) PCT Filed: Apr. 6, 2021

(86) PCT No.: PCT/FR2021/050600
§ 371 (c)(1),
(2) Date: Oct. 6, 2022

(87) PCT Pub. No.: WO2021/205112
PCT Pub. Date: Oct. 14, 2021

(65) Prior Publication Data
US 2023/0155878 A1 May 18, 2023

(30) Foreign Application Priority Data
Apr. 7, 2020 (FR) ...................................... 2003483

(51) Int. Cl.
*H04L 27/34* (2006.01)
*H04L 27/38* (2006.01)

(52) U.S. Cl.
CPC .......... *H04L 27/3433* (2013.01); *H04L 27/38* (2013.01)

(58) Field of Classification Search
CPC ................................ H04L 27/38; H04L 27/36

USPC .......................................................... 375/262
See application file for complete search history.

(56) References Cited

U.S. PATENT DOCUMENTS

2007/0297534 A1* 12/2007 Okunev ................ H04L 27/362
340/10.52
2017/0048841 A1* 2/2017 Hwang ............... H04L 27/3488

FOREIGN PATENT DOCUMENTS

WO 2019091544 A1 5/2019

OTHER PUBLICATIONS

Larsson (Golden Angle Modulation: Geometric and Probabilistic shaping, Aug. 2017: IEEE Wireless Communication Letters PP(99) (Year: 2017).*
Krishnan Rajet et al., "Constellation Optimization in the Presence of Strong Phase Noise", Dec. 1, 2013 (Dec. 1, 2013), vol. 61, No. 12, p. 5056-5066, XP011534886.

(Continued)

*Primary Examiner* — Leila Malek
(74) *Attorney, Agent, or Firm* — David D. Brush; Westman, Champlin & Koehler, P.A.

(57) ABSTRACT

A telecommunication method which includes mapping, by a mapper, input data to points of a constellation, modulating, by a modulator, points of the constellation to generate modulated symbols, and transmitting a radio signal representative of the modulated symbols. The constellation includes a set of N points, the coordinates of which expressed in polar form $\alpha_n \times e^{j\varphi_n}$, $n=1,\ldots,N$, referred to as polar coordinates, are determined such that $a_{n+1}=a_n+p$, $p>0$, the real number being the pitch amplitude of the constellation.

10 Claims, 4 Drawing Sheets

(56) References Cited

OTHER PUBLICATIONS

Ugolini Alessandro et al., "Spiral Constellations for Phase Noise Channels", Nov. 1, 2019 (Nov. 1, 2019), vol. 67, No. 11, p. 7799-7810, XP011757246.
English translation of the Written Opinion of the International Searching Authority dated Oct. 6, 2022 for corresponding International Application No. PCT/FR2021/050600, filed Apr. 6, 2021.
International Search Report dated May 17, 2021 for corresponding International Application No. PCT/FR2021/050600, filed Apr. 6, 2021.
Written Opinion of the International Searching Authority dated May 17, 2021 for corresponding International Application No. PCT/FR2021/050600, filed Apr. 6, 2021.

\* cited by examiner

Fig. 14 ced in its entirety and published as WO 2021/205112 A1 on
TELECOMMUNICATION METHOD WITH POLAR CONSTELLATIONS AND CORRESPONDING DEVICES

CROSS-REFERENCE TO RELATED APPLICATIONS

This Application is a Section 371 National Stage Application of International Application No. PCT/FR2021/050600, filed Apr. 6, 2021, which is incorporated by reference in its entirety and published as WO 2021/205112 A1 on Oct. 14, 2021, not in English.

FIELD OF THE INVENTION

The present invention relates to the field of telecommunications. Within this field, the invention more specifically relates to digital communications involving the transmission of a radio signal (5G, Wi-Fi, etc.). It particularly applies to access points and to portable telecommunication devices.

PRIOR ART

Figures 1, 2:
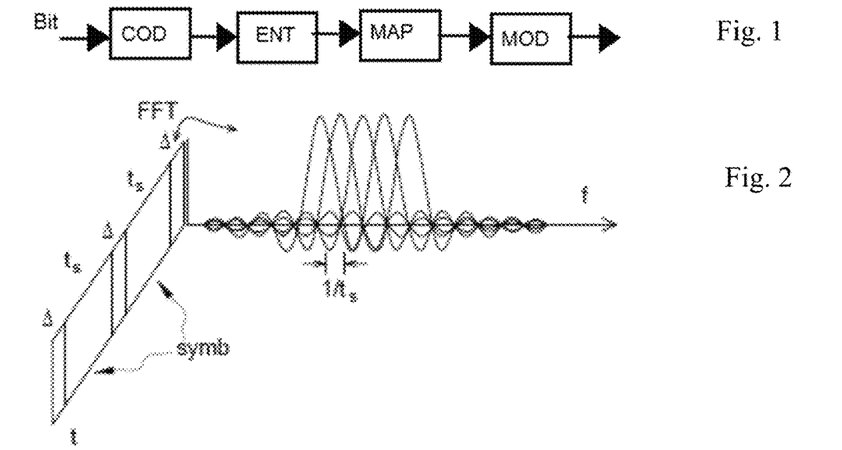
FIG. 1 is a diagram showing a transmission baseband processing chain according to the prior art.
FIG. 2 is a conventional time-frequency representation of GFDM symbols.

Digital communications refer to digital transmission chains that use well-known signal processing modules, as shown in FIG. 1.

A conventional chain is schematically shown in FIG. 1. This chain retrieves input data Bit originating from a binary source such that the binary data represent, for example, an audio (voice) signal, a multimedia signal (television stream, Internet stream), etc. The input data are encoded by an error correcting encoder COD (for example, Turbo Code, LDPC, Polar code). An interleaver ENT interleaves the encoded data. A binary signal encoder MAP converts a binary data packet, for example, a code word, into a point of a constellation (BPSK, QPSK, mQAM, etc.). This encoder is also called mapper and it is equivalently said that the mapper maps the input data to the points of the constellation. The output of this mapper is made up of constellation symbols according to the mapping of the input data or, in the same way, reference is made to mapped data to designate the output data. It should be noted that the m of the expression mQAM (Quadrature Amplitude Modulation) designates the modulation order. The binary signal encoder allows the binary data originating from the channel encoder (error correcting encoder) to be projected, also called mapping, on a two-axis plane following a given constellation. Each point of the constellation thus carries a packet formed by one or more hits. For example, for mapping to BPSK, QPSK or mQAM constellations, the number of bits that can be mapped to a point of the given constellation is as follows:

1 bit for a BPSK;
2 bits for a QPSK or a 4-QAM;
3 hits for an 8-QAM;
4 bits for a 16-QAM, etc.

The mapped data are modulated by a multi-carrier modulator MOD in order to generate multi- carrier symbols. The output of the modulator supplies a power amplifier of the transmitter in order to transmit a radio signal.

Among multi-carrier modulations, OFDM (Orthogonal Frequency Division Multiplexing) modulation has proven to be the reference modulation since it was adopted in various standards such as DAB, DVBT, ADSL, 4G and 5G, The intrinsic qualities of this OFDM modulation have ensured its success in the aforementioned standards. These qualities include that related to a spectrum that is less spread than that of a single-carrier modulation, as well as that related to resistance to the dispersive channels over time and that related to the reception that can take place with a simple equalization with one coefficient per carrier (i.e., ZF (Zero Forcing) processing).

FIG. 2 shows the output of a modulator implementing OFDM modulation, Such an OFDM modulator is often implemented by means of an inverse Fourier transform (IFFT). The various carriers of an OFDM symbol are modulated with the points of the constellation to which the data packets have been mapped. The inter-carrier frequency interval is $1/t_s$, with $t_s$ being the duration of an OFDM symbol. A guard interval of duration $\Delta$ is inserted between two successive OFDM symbols. This guard interval allows echoes to be absorbed that are caused by multiple reflections during radio transmissions by the channel, which is generally the air, This interval can be used to carry out a first "rough" time synchronization of the system (between a transmitter and a receiver). Upon reception, it thus can allow the FFT window to be positioned before demodulating the received radio signal. Implementing the FFT upon reception allows the inverse processing of the IFFT implemented upon transmission to be carried out, i.e., it allows the received OFDM symbols to be demodulated.

Figure 3:
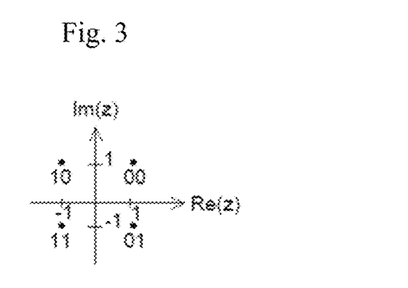
FIG. 3 is a representation along a real axis X(I) and along an imaginary axis Y(Q) of a QPSK constellation with data mapping to the points of the constellation according to Gray coding.
Figure 4:
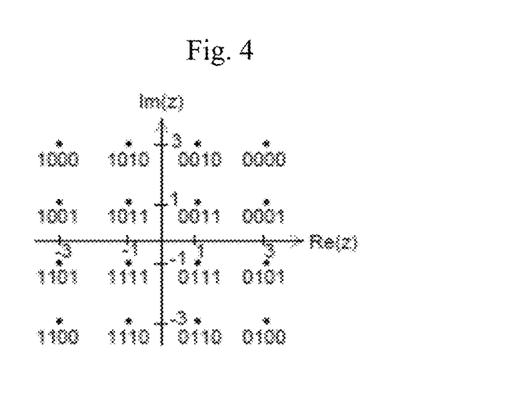
FIG. 4 is a representation along a real axis X(I) and along an imaginary axis Y(Q) of a 16QAM constellation with data mapping to the points of the constellation according to Gray coding.
Figure 5:
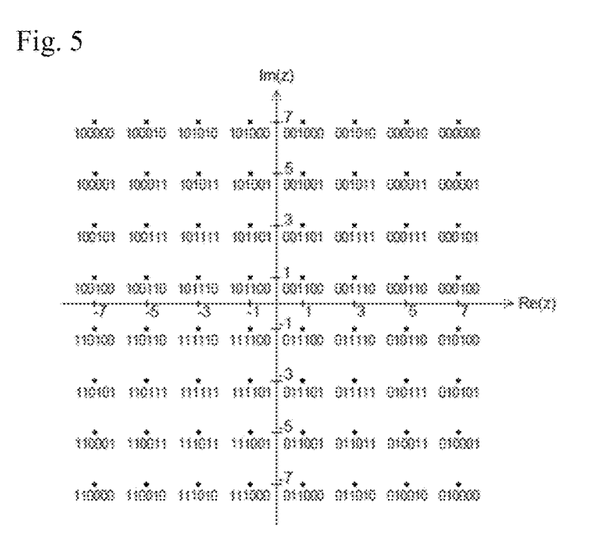
FIG. 5 is a representation along a real axis X(I)and along an imaginary axis Y(Q) of a 64QAM constellation with data mapping to the points of the constellation according to Gray coding.

FIGS. 3, 4 and 5 represent mapping on a QPSK, a 16QAM or a 64QAM, respectively, complying with Gray coding. The Gray coding is such that between a point of the constellation and each of the closest points, the hit packets mapped to these two points differ by only one bit. This particular feature has the advantage of limiting the number of bits affected by an incorrect evaluation upon reception of the received constellation point.

FIGS. 2, 3 and 4 show the fact that the higher the modulation order m the more the system transmits binary information and can achieve a high transmission throughput and therefore improve the spectral efficiency of the system. However, the higher the modulation order the less the system withstands disturbances related to the channel and Additive White Gaussian Noise (BBAG). Thus, the selection of the modulation order must take into account the quality of the transmission link to hope to achieve the maximum possible throughput.

The Amplitude Modulation on two Quadrature carriers (MAQ or QAM: Quadrature Amplitude Modulation) can be referred to as "Cartesian" mapping. This mapping is generally associated with Gray coding, Even though several types of mapping can be specified for the same radio access system (RAN), MAQ mapping is used the most. Indeed, it provides a uniform Euclidean distance between the points of the constellation and it can be simply decoded with threshold solutions. MAQ mapping thus allows high throughputs to be ensured. MAQ mapping is retained, for example, in the DVB-T, IEEE 802.11 (Wi-Fi), 3GPP 4G (release 8 and following) and recently 3GPP 5G (release 15 and following) standards.

Some contemplated scenarios related to the new standards such as 5G or future standards rely on an increasingly higher throughput, which requires shifting or broadening of the radio spectrum in or toward the high bands, i.e., millimeter bands (around 26 GHz in France), and in the near future in even higher bands: Terahertz.

Some use cases of 5G make provision for addressing sensors which are distributed both inside (indoor) and outside (outdoor) or make provision for being able to communicate with high mobility terminals (for example, on board a very high speed train, i.e., TGV train). These use cases are therefore found in contexts with higher constraints. The increase in constraints causes significant variations in the phase of the received signals. These variations may be derived from the phase noise of the oscillators in the high bands, the high-speed movement of the terminal (TGV), which generates the Doppler effect or the lower quality of the oscillators of the low-cost sensors, since the temperature variations can degrade the oscillators, which do not have temperature control. Since the QAM constellations are highly sensitive to the phase variations of the carrier, known pilots are conventionally transmitted in order to estimate the variations of the transmission channel. This choice is retained for DVB-T or 4G-5G systems. In standards such as DVB-T and IEEE 802.11 (Wi-Fi), the phase variations of the carrier are estimated from pilots called continuous pilots. However, for the new standards defined by the 3GPP consortium (4G, 5G, etc.), there are no continuous pilots. Thus, in order to withstand high phase variations, the 3GPP systems (4G-5G) are compelled to use weaker constellations, the QPSK in this case, but to the detriment of the throughput.

Therefore, a requirement exists for a telecommunication method that allows the situation to be improved for future standards.

DISCLOSURE OF THE INVENTION

The invention proposes a telecommunication method comprising:
  mapping, by a mapper, input data to points of a constellation;
  modulating, by a modulator, points of the constellation in order to generate modulated symbols;
  transmitting a radio signal representing the modulated symbols.

The method is such that the constellation comprises a set of N points, the coordinates of which expressed in polar form a $\alpha_n \times e^{j\varphi_n}$, n=1, ..., N, called polar coordinates with reference to a two- axes representation, are determined such that $\alpha_{n+1}=\alpha_n+p$, p>0 being a real number which is the amplitude pitch of the constellation.

The telecommunication method allows various constraints to be addressed with respect to phase variations or amplitude variations (noise) by modifying the value of the pitch, which can be configured, and/or by defining phase values for the various points. This method is therefore very flexible and adaptable as a function of the phase or noise constraints.

The constellation that is used allows the resilience of the system to be increased with respect to the phase variations caused by the imperfections of the oscillators, in particular for high frequencies above 6 GHz. The number of points on the same circle will determine the phase variation that the method makes it possible to absorb.

The method allows a phase variation to be absorbed that can reach up to $2\pi$.

According to a first configuration, an identical phase $\varphi$ simply needs to be configured for all the points of the constellation. According to this configuration, the receiver can demodulate the mapped data only by recovering the amplitude of the received data. This configuration allows the receiver to be simplified.

According to a second configuration, the phase simply needs to be configured such that $\varphi_{n+1}=\varphi_n+p'$, with p'>0. This configuration is more noise resistant than the preceding configuration since it can also allow amplitude variations to be absorbed.

Such a method is highly advantageous since, by a simple modification of the pitch, which can be configured, the order of the modulation can be changed. Thus, assuming that a pitch of one is associated with an order of 16, then, by dividing the pitch by two, the number of circles is doubled, and an order is obtained that is twice as high, and so on.

According to a particular embodiment of the invention, the modulation is a multi-carrier modulation.

According to a particular embodiment of the invention, the two axes define quadrants and the polar coordinates are determined per quadrant: $\alpha_{n+1}=\alpha_n+p$, n=1, ..., N/4. This embodiment allows large modulation orders to be used in order to respond to the increasing throughput demand, even in the absence of pilots, while allowing a phase variation to be absorbed that can reach up to $\pi/2$ by limiting the number of points on the same circle to four.

According to a particular embodiment of the invention, the two axes define quadrants and the polar coordinates are determined per set of two quadrants: $\alpha_{n+1}=\alpha_n+p$, n=1, ..., N/2. This embodiment allows large modulation orders to be used in order to respond to the increasing throughput demand, even in the absence of pilots, while allowing a phase variation to be absorbed that can reach up to $\pi$ by limiting the number of points on the same circle to two.

According to a particular embodiment of the invention, the polar coordinates are also determined such that $\varphi_{n+1}\varphi_n+p'=\varphi_n+p''''\times\pi$, with p'''' being a non-zero real number. This embodiment uses constellations, called spiral constellations, that are particularly suitable for systems confronted with a significant amount of phase noise, which is the case, for example, when the communications occur in the THz band. Indeed, the oscillators have a significant amount of phase noise at these frequencies, The spiral constellations defined over all $2\pi$, in other words the four quadrants are considered as a whole, provide both good immunity to noise and good immunity to phase variations and are therefore particularly advantageous for communications in the THz band. This embodiment exhibits an equally good ability to withstand phase variations as an embodiment in which all the points of the constellation have the same phase and, furthermore, it advantageously increases the minimum Euclidean distance of the points of the constellation.

According to a particular embodiment of the invention, N=16, p=1 and for each quadrant $\varphi_n=\alpha\times\pi/12$, with $\alpha$ being a natural integer. This embodiment is particularly advantageous since the symbols that are obtained can be demodulated by a conventional demodulator, they are compatible with demodulators suitable for the conventional 16-QAM modulation, in which the four points of a quadrant are distributed as a square.

According to a particular embodiment of the invention, for each quadrant $\varphi_{n+1}=\varphi_n$ n=1, ..., N/4. This embodiment exhibits less robustness against phase variations than an embodiment in which all the points of the constellation have the same phase, but it advantageously increases the minimum Euclidean distance of the points of the constellation.

According to a particular embodiment of the invention, for two quadrants taken together $\varphi_{n+1}=\varphi_n$ n=1, ..., N/2. This embodiment exhibits less robustness against phase variations than an embodiment in which all the points of the constellation have the same phase, but it advantageously increases the minimum Euclidean distance of the points of the constellation.

According to a particular embodiment of the invention, $\varphi_n=\varphi$ for n=1, ..., N. According to this embodiment all the points of the constellation have the same phase. This embodiment exhibits good robustness against phase variations and, furthermore, demodulation upon reception involves simple determination of the amplitude of the received point.

A further subject of the invention is a telecommunication equipment capable of implementing a method according to the invention. The equipment comprises:
- a mapper for mapping input data to points of a constellation, the constellation comprising a set of N points, the coordinates of which expressed in polar form $\alpha_n \times e^{j\varphi_n}$, n=1, . . . , N, called polar coordinates with reference to a two-axes representation defining four quadrants, are determined such that $\alpha_{n+1} = \alpha_n + p$, p being a real number which is the amplitude pitch of the constellation, p>0;
- a modulator for modulating points of the constellation and generating modulated symbols;
- a transmitter for transmitting a radio signal representing modulated symbols.

A further subject of the invention is a reception method comprising:
- receiving a radio signal representing modulated symbols;
- demodulating, by a demodulator, the modulated symbols in order to estimate points of a constellation;
- demapping, by a demapper, the points of the constellation in order to estimate data napped to these constellation points.

The method is such that the constellation comprises a set of N points, the coordinates of which expressed in polar form $\alpha_n \times e^{j\varphi_n}$, n=1, . . . , N, called polar coordinates with reference to a two-axes representation, are determined such that $\alpha_{n+1} = \alpha_n + p$, p>0 being a real number which is the amplitude pitch of the constellation.

A further subject of the invention is a telecommunication equipment capable of implementing a reception method according to the invention. The equipment comprises:
- a receiver for receiving a radio signal representing modulated symbols;
- a demodulator for demodulating the modulated symbols and estimating points of a constellation, the constellation comprising a set of N points, the coordinates of which expressed in polar form $\alpha_n \times e^{j\varphi_n}$, n=1, . . . , N, called polar coordinates with reference to a two-axes representation defining four quadrants, are determined such that $\alpha_{n+1} = \alpha_n + p$, p>0 being a real number which is the amplitude pitch of the constellation;
- a demapper for demapping the points of the constellation and estimating data mapped to these constellation points.

A further subject of the invention is a transmitted or received digital signal comprising symbols modulated with points of a constellation, the constellation comprising a set of N points, the coordinates of which expressed in polar form $\alpha_n \times e^{j\varphi_n}$, n=1, . . . , N, called polar coordinates with reference to a two-axes representation defining four quadrants, are determined such that $\alpha_{n+1} = \alpha_n + p$, p, the positive real number being the amplitude pitch of the constellation.

The proposed invention thus allows several objectives to be achieved:
- increasing the resilience of the system with respect to phase variations caused by the imperfections of the oscillators for high frequencies above 6 GHz;
- improving the intrinsic quality for "low-cost" systems;
- improving the robustness of the modulators and demodulators with respect to the Doppler effect, which is basically caused by the movement of the receiver/terminal.

All the improvements that are provided allow the multi-carrier systems to be used for high frequencies, in particular the millimeter hands and over.

DESCRIPTION OF AN EMBODIMENT OF THE INVENTION

The general principle of the invention is based on mapping data to a constellation, the V points of which are distributed over concentric circles with a constant pitch p between the circles. The pitch p is a positive, non-zero real number. The points of the constellation are therefore distributed over at least two separate circles. The N points have coordinates expressed in polar form $\alpha_n \times e^{j\varphi_n}$, n=1, . . . , N, called polar coordinates with reference to a two-axis representation defining four quadrants, with the constraint that $\alpha_{n+1} = \alpha_{n+p}$.

The constellation has the particular feature that there is at most one point on each circle per quadrant considered for the expression of the constellation in polar form. When the constellation is determined on a quadrant of size $2\pi$, that is the quadrant $[0-2\pi[$, then there is at most one point per circle. When the constellation is determined per quadrant of size $\pi$, that is for the quadrants $[0, \pi[$ and $[\pi,0[$ or $$\left[\frac{\pi}{2}, 3\frac{\pi}{2}\right[$$

and $$\left[3\frac{\pi}{2}, \frac{\pi}{2}\right[,$$

then there is at most one point per semi-circle. When the constellation is determined per quadrant of size $\pi/2$, that is for the quadrants $[0, \pi/2[$, $[\pi/2, \pi[$, $$\left[\pi, 3\frac{\pi}{2}\right[$$

and $$\left[3\frac{\pi}{2}, 0\right[,$$

then there is at most one point per quarter circle.

The Cartesian coordinates (x, y) before normalization corresponding to the polar coordinates of the points of the constellation are expressed as: $x(i)=\alpha(i)\cdot\cos(\varphi)$; $y(i)=\alpha(i)\cdot\sin(\varphi)$, with $\varphi\in[0, 2\pi[$.

By configuring a pitch p=1 and considering the amplitude of the first point as equal to one, then: $\alpha(1)=1$ and $\alpha(i+1)=\alpha(i)+1$.

The normalization factor "F" is dependent on the pitch between the points of the constellation and the modulation order m. Under these conditions, it is provided by the expression:

$$F(m) = \frac{1}{\sqrt{\frac{\sum_i^M a(i)^2}{m}}}.$$

The normalization operation is an operation that is well known to a person skilled in the art, therefore it is not described any further. Indeed, it is quite common to apply a normalization factor to the various symbols when mapping or on completion of mapping.

Figure 6:
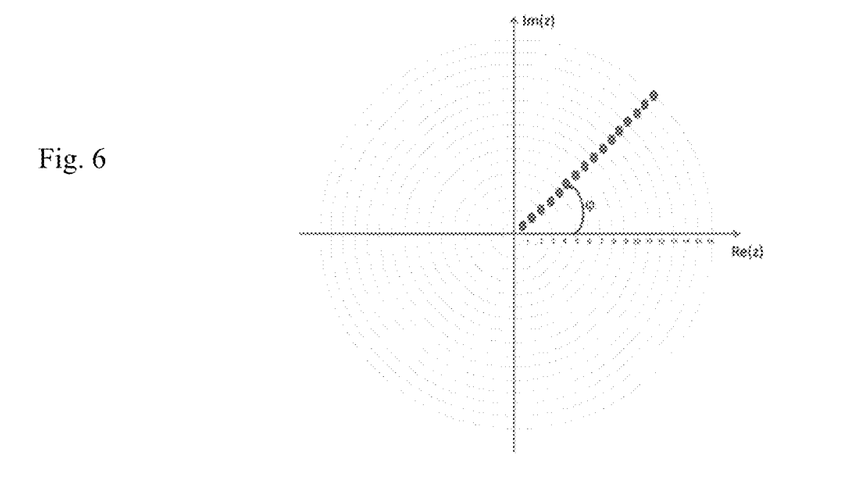
FIG. 6 is a representation along a real axis X(I) and along an imaginary axis Y(Q) of a first configuration of a constellation used in a method according to the invention.

FIG. 6 shows a first configuration of a constellation used according to the invention. This configuration has the particular feature that its points are distributed over a quadrant that represents $[0-2\pi[$ and that the phase $\varphi$ is the same for all its points. Each point has the following coordinates: $\alpha_{n\times e}{}^{j\varphi}$, $\alpha_n$=n×p, n=1, . . . , N. Therefore, the amplitude of a point simply needs to be found in order to determine this point. Thus, the receiver can demodulate the data which are mapped according to this configuration only by using the amplitude of the received data.

The configuration that is shown corresponds to a constellation of the order m=16. The following table is an example of Gray coding used with this configuration.

| i | Gray coding |
|---|---|
| 1 | 0000 |
| 2 | 0001 |
| 3 | 0011 |
| 4 | 0010 |
| 5 | 0110 |
| 6 | 0111 |
| 7 | 0101 |
| 8 | 0100 |
| 9 | 1100 |
| 10 | 1101 |
| 11 | 1111 |
| 12 | 1110 |
| 13 | 1010 |
| 14 | 1011 |
| 15 | 1001 |
| 16 | 1000 |

This first configuration advantageously allows the common phase variation to be estimated of an OFDM symbol between the transmitted signal and the received signal by computing the average phase error on an OFDM symbol. This allows pilots called continuous pilots to he dispensed with. This first configuration is very efficient with respect to phase variations but to the detriment of robustness against additive white Gaussian noise, since the minimum distance between the transmitted points is short.

Figure 7:
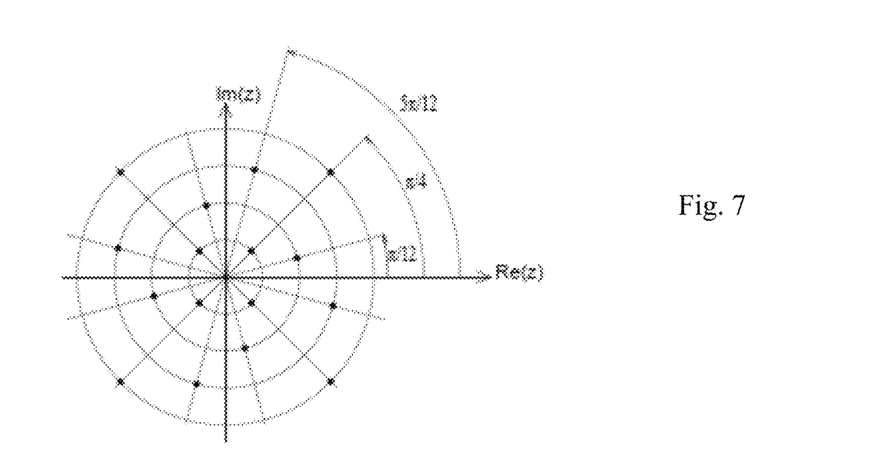
FIG. 7 is a representation along a real axis X(I) and along an imaginary axis Y(Q) of a 10 second configuration of a constellation used in a method according to the invention.

FIG. 7 shows a second configuration of a constellation used according to the invention. This constellation is of the order m=16. It has the particular feature that the pattern of the points is reproduced between the four quadrants, with each quadrant representing $[0, \pi/2[$. Each point of a quadrant has the following coordinates: $\alpha_n \times e^{j\varphi n}$, $\alpha_n$=n×p, n=1, . . . , N/4, N=16. Thus, for each quadrant, there is only one point per concentric circle and the phase $\varphi_n$ of the point n is selected according to a determined criterion, for example, with a constant pitch of $\pi/6$ between two points or a zero pitch between the two points on the remotest circles in the same quadrant. This second embodiment is less efficient with respect to phase variations than the first embodiment but is more robust against additive white Gaussian noise, since the minimum distance between the transmitted points is longer.

According to the illustrated example of this second embodiment, the phase $\varphi_n$ is a multiple of $\pi/12$ and more particularly $\varphi_1=\varphi_4=\pi/4$, $\pi_2=\pi/12$ and $\varphi_3 5 \pi/12$. This second embodiment as illustrated is highly advantageous since it is compatible with many existing OFDM demodulators capable of demodulating an OFDM/16QAM modulation. Indeed, for each quadrant, the points are close to those of a conventional 16QAM constellation, as shown in FIG. 4.

Figure 8:
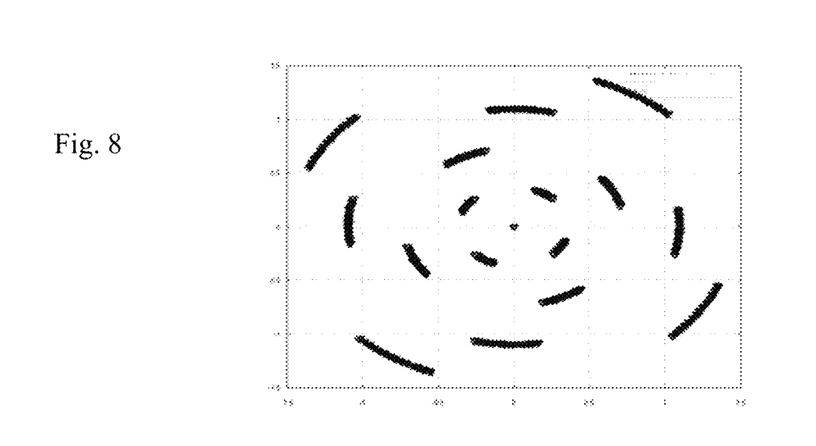
FIG. 8 schematically shows the maximum of the phase variation capable of impacting the points of the modulation, shown in FIG. 7.

FIG. 8 shows the maximum phase variation that can affect the points of the modulation, shown in FIG. 7, during the transmission that remains compatible with a correct reception demodulation.

Figure 9:
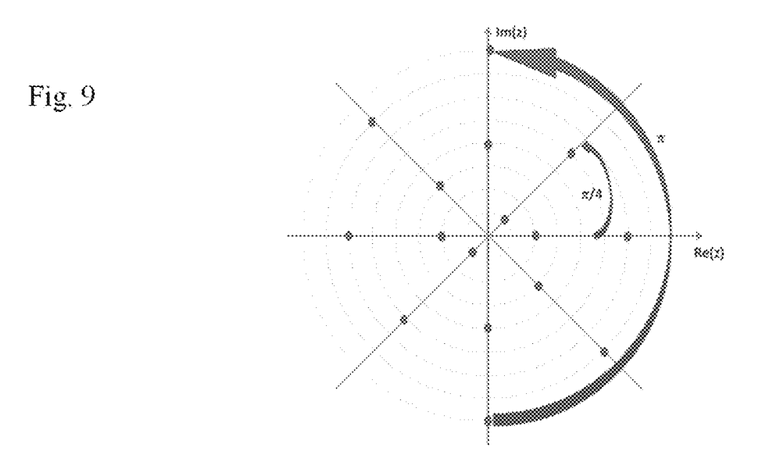
FIG. 9 is a representation along a real axis X(I) and along an imaginary axis Y(Q) of a third configuration of a constellation used in a method according to the invention.

Within the limit of this maximum, as long as the phase variation remains within the limit of $+\pi/4$ with respect to the phase of the transmitted point, the receiver can demodulate the received points of the modulation despite the phase variation between the transmitter and the receiver, and without ambiguity, FIG. 9 shows a third configuration of a constellation used according to the invention. This constellation is of the order m=16. It has the particular feature that the pattern of the points is reproduced between the two quadrants, with each quadrant representing $[0-\pi[$. Each point of a quadrant has the following coordinates: $\alpha_n \times e^{j\varphi n} \alpha_n$=n×p, n=1, . . . , N/2, N=16. Thus, for each quadrant, there is only one point per concentric circle and the phase $\varphi_n$ of the point n is selected according to a determined criterion, for example, with a constant pitch of $-\pi/4$ and modulo $\pi$ if between two successive points in order to remain in the same quadrant.

The points can be considered to be described with an amplitude pitch of "1" and with a periodicity of 8, resulting in two constellation points for the same amplitude. The Cartesian coordinates can be expressed as:

$$x(i)=\alpha(i)\cdot\cos(\varphi i); y(i)=\alpha(i)\cdot\sin(\varphi_i)$$

with $\alpha(1)=1$ and $\alpha(i+1)=\alpha(i)+1$ (period of 8), $\alpha(9)=\alpha(1)=1$ and $\varphi_i=\varphi_i+[i/9]\times\pi-i\pi/4$ with, for example, $\varphi_1=\pi/4$ being the starting point of the constellation.

This constellation is very robust against phase variations of $\pm\pi/2$ but exhibits reduced performance capabilities with respect to additive white Gaussian noise compared to a modulation shown in FIG. 7.

Figure 10:
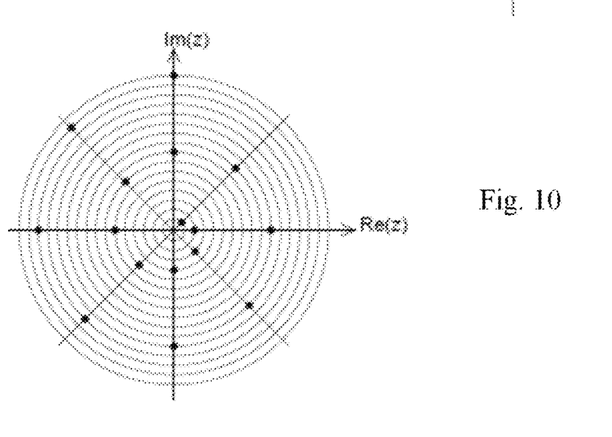
FIG. 10 is a representation along a real axis X(I) and along an imaginary axis Y(Q) of a fourth configuration of a constellation used in a method according to the invention.

FIG. 10 shows a fourth configuration of a constellation used according to the invention, called spiral constellation. As for the first configuration shown in FIG. 6, this fourth configuration has the particular feature that the points are distributed over a quadrant that represents $[0-2\pi[$. The configuration shown corresponds to a constellation of the order m=16. Each point has the following coordinates: $\alpha_n \times e^{j\varphi n}$, $\alpha_n=n\times p$, $n=1, \ldots, 16$ and a phase $\varphi_n$ with a determined pitch between two successive points, i.e., on two successive circles, for example, a constant pitch of $-\pi/4$, $\varphi_{n+1}=\varphi_n-\pi/4$. Therefore, unlike the first configuration, the phase $\varphi_n$ is not constant but varies between the successive points. As for the first configuration, this fourth configuration is particularly advantageous with respect to phase variations since the reception demodulation can take place only upon detection of amplitude of the received constellation points. Any phase variation when transmitting between the transmitter and the receiver does not affect the demodulation. This fourth configuration is more advantageous than the first configuration in terms of the minimum distance between all points and is therefore more robust against additive white Gaussian noise since the minimum distance between the transmitted points is greater than for the first configuration.

The constellation of FIG. 9 can be defined as two half-order spiral constellations on two quadrants $[0, 2\pi[$ offset by $\pi$ with respect to each other.

The following table is a possible example of mapping binary data to the points of a constellation according to the fourth configuration shown in FIG. 10, in accordance with Gray coding. The modulation order is m=16, the amplitude pitch of the points of this constellation is p=1, the phase is a multiple of $\pi/4$.

| i | Gray coding | Z(i) before normalization |
|---|---|---|
| 1 | 0000 | 1. $e^{j\pi/4}$ |
| 2 | 0001 | 2 |
| 3 | 0011 | 3. $e^{-j\frac{\pi}{4}}$ |
| 4 | 0010 | 4. $e^{-j\frac{\pi}{2}}$ |
| 5 | 0110 | 5. $e^{-j\left(\frac{3\pi}{4}\right)}$ |
| 6 | 0111 | 6. $e^{-j\pi}$ |
| 7 | 0101 | 7. $e^{-j\left(\frac{5\pi}{4}\right)}$ |
| 8 | 0100 | 8. $e^{j\frac{\pi}{2}}$ |
| 9 | 1100 | 9. $e^{j\pi/4}$ |
| 10 | 1101 | 10 |
| 11 | 1111 | 11. $e^{-j\frac{\pi}{4}}$ |
| 12 | 1110 | 12. $e^{-j\frac{\pi}{2}}$ |
| 13 | 1010 | 13. $e^{-j\left(\frac{3\pi}{4}\right)}$ |
| 14 | 1011 | 14. $e^{-j\pi}$ |
| 15 | 1001 | 15. $e^{-j\left(\frac{5\pi}{4}\right)}$ |
| 16 | 1000 | 16. $e^{j\frac{\pi}{2}}$ |

Figure 11:
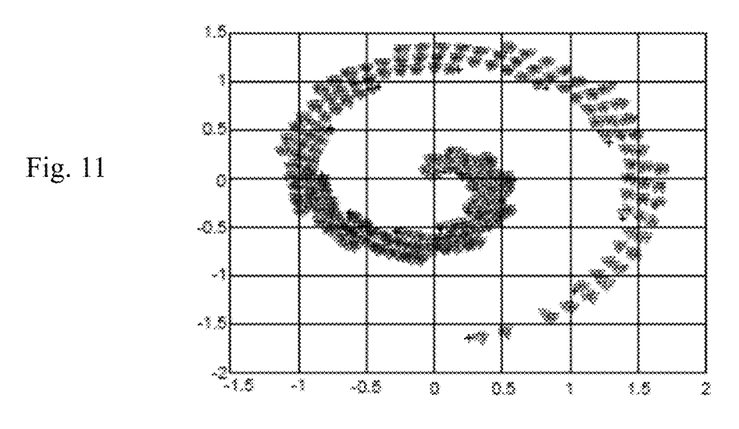
FIG. 11 schematically shows the maximum of the phase variation capable of impacting the points of the modulation, shown in FIG. 10.
Figure 12:
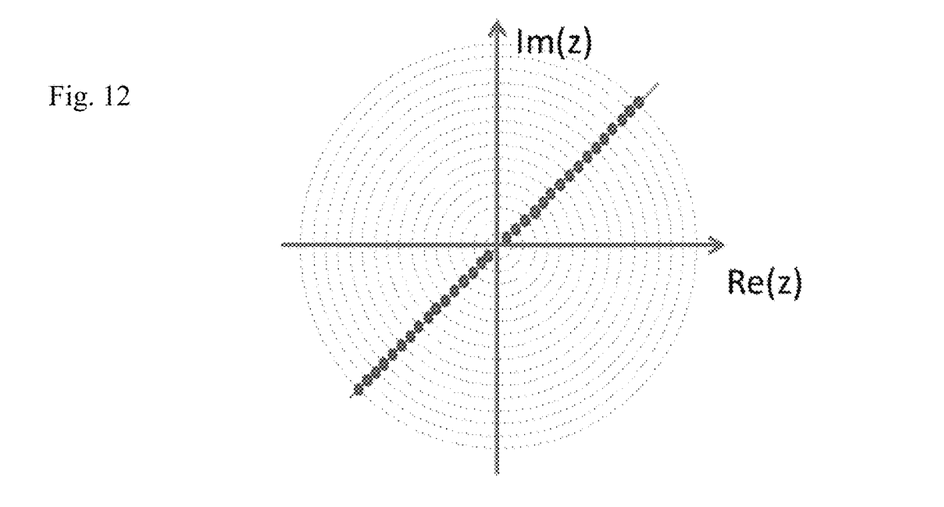
FIG. 12 is a representation along a real axis X(1) and along an imaginary axis Y(Q) of another configuration of a constellation used in a method according to the invention.

FIG. 11 shows the result of a frequency deviation between the transmitter and the receiver with the constellation defined above over several consecutive OFDM symbols. FIG. 11 shows the maximum phase variation that can affect the points of the "spiral" modulation, shown in FIG. 10, which remains acceptable for a correct demodulation. This "spiral" structure allows high phase variations to be withstood between the transmitter and the receiver of the system. This embodiment is particularly suitable for systems operating in THz bands, for which there is very high phase noise clue to low-performance oscillators. In order to respond to an increase in throughput (for example, twice as much throughput), a new embodiment of a constellation according to the first configuration can be determined by reproducing the points of FIG. 6 on the third quadrant, as shown in FIG. 12. The order of the embodiment shown is m=32. By reproducing the points of FIG. 6 on the three other quadrants an order of m=64 is easily obtained.

In order to respond to an increase in throughput, the pitch p can be divided, for example, by two, by four, etc.

Figure 13:
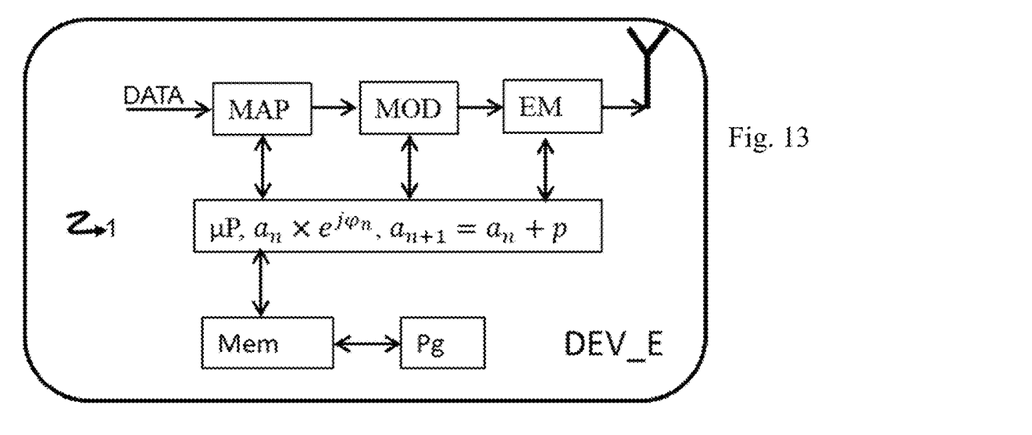
FIG. 13 is a diagram of the simplified structure of an equipment according to the invention capable of implementing a telecommunication method according to the invention.

The simplified structure of an embodiment of an equipment according to the invention capable of implementing a telecommunication method according to the invention is shown in FIG. 13. This equipment DEV_E can be a base station as well as a mobile terminal.

The equipment DEV_E comprises a microprocessor μP, the operation of which is controlled by executing a program Pg, the instructions of which enable a telecommunication method according to the invention to be implemented. The equipment DEV_E further comprises a mapper MAP, an OFDM-type modulator MOD, a transmitter EM, a memory Mem comprising a buffer memory. The OFDM-type modulator MOD is conventionally produced by implementing an inverse Fourier transform IFFT.

On initialization, the code instructions of the program Pg are loaded, for example, into the buffer memory Mem before being executed by the processor μP. The microprocessor μP controls the various components: mapper MAP, modulator MOD, transmitter EM.

The configuration of the equipment comprises at least the order of the modulation, the pitch of the constellation, as well as the value of $\alpha_1$. The order of the modulation determines the number of points N. Thus, by executing the instructions, the microprocessor µP:
- determines the polar coordinates of the points of the constellation: $\alpha_n \times e^{j\varphi n}$, n=1, ..., N, such that $\alpha_{n+1}=\alpha_n+p$, p>0;
- controls the various components so that:
  - the mapper MAP maps the input data DATA to the points of the constellation;
  - the modulator MOD modulates the data which are mapped on the various carriers in order to generate OFDM symbols;
  - the transmitter EM transmits a radio signal representing the OEDM symbols.

Figure 14:
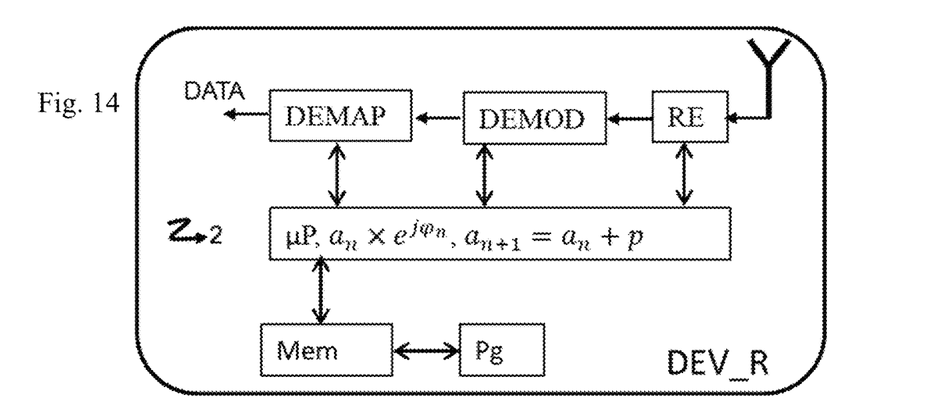
FIG. 14 shows a schematic diagram of the simplified structure of an equipment according to the invention capable of implementing a reception method according to the invention.

The simplified structure of an embodiment of an equipment according to the invention capable of implementing a reception method according to the invention is shown in FIG. 14. This equipment DEV_R can he a base station as well as a mobile terminal.

The equipment DEV_R comprises a microprocessor IR, the operation of which is controlled by executing a program Pg, the instructions of which enable a reception method according to the invention to be implemented. The equipment DEV_R further comprises a demapper DEMAP, an OFDM-type demodulator DEMOD, a receiver RE, a memory Mem comprising a buffer memory. On initialization, the code instructions of the program Pg are loaded, for example, into the buffer memory Mem before being executed by the processor µP. The microprocessor µP controls the various components: demapper DEMAP, demodulator DEOD, receiver RE.

The demodulator DEMOD carries out the inverse operation of the modulator MOD. The demapper DEMAP carries out the inverse operation of the mapper MAP. Conventionally, the demodulator is produced by means of a Fourier transform FFT.

The configuration of the equipment comprises at least the order of the modulation, the pitch of the constellation, as well as the value of $\alpha_1$. The order of the modulation determines the number of points N. Thus, by executing the instructions, the microprocessor µP:
- determines the polar coordinates of the points of the constellation: $\alpha_n \times e^{j\varphi n}$, n=1, ..., N, such that $\alpha_{n+1}=\alpha_n+p$, p>0;
- controls the various components so that:
  - the receiver RE receives the radio signal representing OFDM symbols;
  - the demodulator DEMOD demodulates the OFDM symbols in order to estimate the points of the constellation mapped on the various carriers;
  - the demapper MAP demaps the points of the constellation in order to estimate the data DATA.

The equipment DEV_R that receives the radio signal which is transmitted according to an embodiment of a method according to the invention can demodulate the received points of the constellation by estimating the amplitude of the received point $(x_r(i), y_r(i))$:

$$x_r(i)=\alpha_r(i) \cos (\varphi_r(i)+b_x(i)$$

$$y_r(i)=\alpha_r(i) \sin (\varphi_r(i)+b_y(i)$$

$b_x$ and $b_y$ is the additive white Gaussian noise projected on the X and Y channels.

Knowing the constellation, and given that there is no more than one point per circle on a quadrant, the equipment DEV_R can therefore determine the received point on the basis of the amplitude, with uncertainty with respect to its position if several quadrants were considered on transmission in order to define the constellation.

After estimating the amplitude of the received point, die equipment DEV_R can estimate the phase error by comparing the estimated points projected on the X(I) and Y(Q) axes with the transmitted points. The phase error is essentially derived from the additive white Gaussian noise:

$$\Delta\varphi(i)=\varphi(i)-(\varphi_r(i))+b(i).$$

By summing the various phase error estimates made on each OFDM carrier, i.e., for each point of the constellation that modulated a carrier, the equipment DEV_R can experience an improvement in the estimation of the phase error and thus reduce the influence of the white noise:

$$\Delta_\varphi = M \sum_{i=1}^{M} \Delta_{\varphi(i)},$$

with M being the number of OFDM carriers used to estimate the phase variations. Once the estimation of the common phase error is complete, the equipment DEV_R can correct all the constellation points modulating an OFDM symbol. This correction can be carried out both in the frequency domain, i.e., after the IFFT demodulation, and in the time domain, i.e., before the IFFT demodulation. By making the correction in the time domain this allows the inter-carrier interference that is derived from the phase rotation to he reduced.

Determining the phase error allows the demodulation error to be reduced.

Accordingly, the invention also applies to one or more computer programs, in particular a computer program on or in a storage medium, suitable for implementing the invention. This program can use any programming language, and can be in the form of source code, object code, or of intermediate code between source code and object code, such as in a partially compiled form, or in any other form suitable for implementing a method according to the invention.

The information medium can be any entity or device capable of storing the program. For example, the medium can comprise a storage means, such as a ROM, for example, a CD-ROM or a microelectronic circuit ROM, or even a magnetic recording means, for example, a USB key or a hard disk.

Furthermore, the information medium can be a transmissible medium such as an electrical or optical signal, which can he routed via an electrical or optical cable, by radio or by other means.

The program according to the invention particularly can be downloaded over an Internet-type network.

Alternatively, the information medium can be an integrated circuit in which the program is incorporated, with the circuit being adapted for executing or for being used in the execution of the method in question.

The invention claimed is:

1. A telecommunication method implemented by a telecommunication equipment and comprising:
   mapping, by a mapper, input data to points of an N-order constellation comprising a set of N points, the coordinates of each point of the N points being expressed in polar form $\alpha_n \times e^{j\varphi n}$, for n=1, ..., N, and called polar coordinates, wherein the polar coordinates of the points of the constellation are determined per quadrant with a quadrant size taken from among $\{\pi/2, \pi, 2\pi\}$, wherein each quadrant comprises M points of the constellation with M taken from among {N/4, N/2, N} for quadrant size taken from among {π/2, π, 2π} respectively, and wherein per quadrant, for j=1, ..., M−1:

$\alpha_1 > 0$, $\alpha_{j+1} = \alpha_j + p$, with p being an amplitude pitch of the constellation, p>0 being a real number, $\varphi_n$ is chosen according to a determined criterion, and wherein the points of the constellation are distributed in each quadrant over concentric circles with the amplitude pitch p between the circles and wherein in each quadrant there is at most one point of the constellation on each circle;

modulating, by a modulator, points of the constellation order to generate modulated symbols; and transmitting a radio signal representing the modulated symbols.

2. The telecommunication method as claimed in claim 1, such that the modulation is a multi-carrier modulation.

3. The telecommunication method as claimed in claim 1, wherein the N points of the constellation are distributed over two quadrants, each quadrant having a quadrant size equal to π and comprising M=N/2 points of the constellation, and wherein the M points in each quadrant are shifted by π between the two quadrants.

4. The telecommunication method as claimed in claim 1, wherein per each quadrant, $\varphi_n$ varies between two successive values of n with a constant phase pitch.

5. A reception method implemented by a telecommunication equipment and comprising:

receiving a radio signal representing modulated symbols;

demodulating, by a demodulator, the modulated symbols in order to estimate points of an N-order constellation comprising a set of N points, the coordinates of each point of the N points being expressed in polar form $\alpha_n \times e^{j\varphi_n}$, n=1, ..., N and called polar coordinates; and demapping, by a demapper, points of the constellation in order to estimate data mapped to these constellation points;

wherein the polar coordinates of the points of the constellation are determined per quadrant with a quadrant size taken from among {π/2, π, 2π}, each quadrant comprising M points of the constellation with M taken from among {N/4, N/2, N} for a quadrant size taken from among {π/2, π, 2π} respectively, wherein per quadrant, for j=1, ..., M−1:

$\alpha_1 > 0$, $\alpha_{j+1} = \alpha_j + p$, with p being an amplitude pitch of the constellation, p>0 being a real number, $\varphi_n$ is chosen according to a determined criterion, and wherein the points of the constellation are distributed in each quadrant over concentric circles with the amplitude pitch p between the circles and wherein in each quadrant there is at most one point of the constellation on each circle.

6. The reception method as claimed in claim 5, wherein per each quadrant, $\varphi_n$ varies between two successive values of n with a constant phase pitch.

7. A telecommunication equipment, which comprises:

a mapper which maps input data to points of an N-order constellation, the constellation comprising a set of N points, the coordinates of each point of the N points being expressed in polar form $\alpha_n \times e^{j\varphi_n}$, for n=1, ..., N, and called polar coordinates, wherein the polar coordinates of the points of the constellation are determined per quadrant with a quadrant size taken from among {π/2, π, 2π}, wherein each quadrant comprises M points of the constellation with M taken from among {N/4, N/2, N} for a quadrant size taken from among {π/2, π, 2π} respectively, and wherein per quadrant, for j=1, ..., M−1:

$\alpha_1 > 0$, $\alpha_{j+1} = \alpha_j + p$, with p being an amplitude pitch of the constellation, p>0 being a real number, $\varphi_n$ is chosen according to a determined criterion; and wherein the points of the constellation are distributed in each quadrant over concentric circles with the amplitude pitch p between the circles and wherein in each quadrant there is at most one point of the constellation on each circle;

a modulator which modulates points of the constellation and generating modulated symbols; and a transmitter which transmits a radio signal representing the modulated symbols.

8. The telecommunication equipment as claimed in claim 7, wherein per each quadrant, $\varphi_n$ varies between two successive values of n with a constant phase pitch.

9. A telecommunication equipment, which comprises:

a receiver which receives a radio signal representing modulated symbols;

a demodulator which demodulates the modulated symbols and estimating points of an N-order constellation, the constellation comprising a set of N points, the coordinates of each of the N points being expressed in polar form $\alpha_n \times e^{j\varphi_n}$, for n=1, ..., N, and called, polar coordinates, wherein the polar coordinates of the points of the constellation are determined per quadrant with a quadrant size taken from among {π/2, π, 2π}, each quadrant comprising M points of the constellation with M taken from among {N/4, N/2, N} for a quadrant size from among {π/2, π, 2π} respectively, and wherein per quadrant, for j=1, ..., M−1:

$\alpha_1 > 0$, $\alpha_{j+1} = \alpha_j + p$, with p being an amplitude pitch of the constellation, p>0 being a real number, and $\varphi_n$ is chosen according to a determined criterion, wherein the points of the constellation are distributed in each quadrant over concentric circles with the amplitude pitch p between the circles and wherein in each quadrant there is at most one point of the constellation on each circle; and a demapper which demaps the points of the constellation and estimating data mapped to these constellation points.

10. The telecommunication equipment as claimed in claim 9, wherein per each quadrant, $\varphi_n$ varies between two successive values of n with a constant phase pitch.

* * * * *